G. W. Mowbray,
Purifying Nitric Acid.
N° 94,969. Patented Sep. 21, 1869.
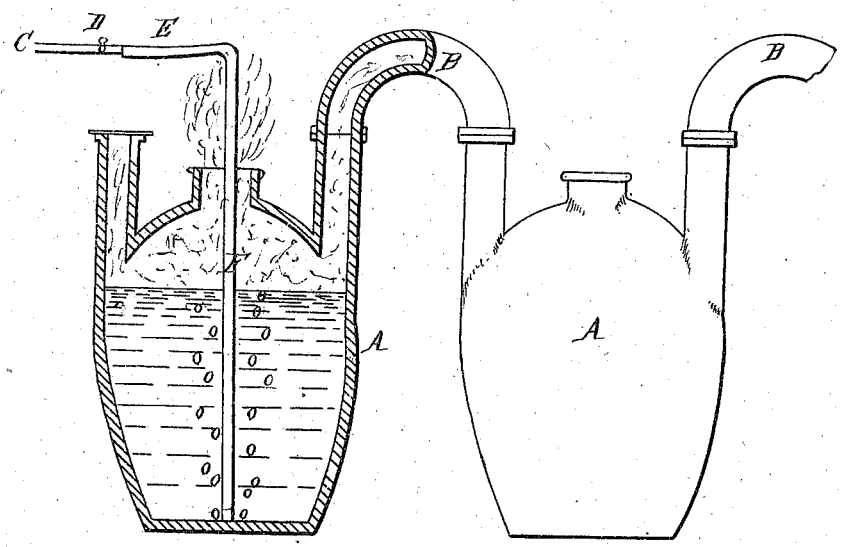
Witnesses.
J. J. Holden
Harry Mowbray
Inventor
Geo. M. Mowbray

United States Patent Office.

GEORGE M. MOWBRAY, OF TITUSVILLE, PENNSYLVANIA.

Letters Patent No. 94,969, dated September 21, 1869.

IMPROVED METHOD OF PURIFYING NITRIC ACID.

The Schedule referred to in these Letters Patent and making part of the same.

To all whom it may concern:

Be it known that I, GEORGE M. MOWBRAY, of the city of Titusville, county of Crawford, in the State of Pennsylvania, have invented a new and improved Mode of Purifying Nitric Acid and other acids containing nitrous acids; and I do hereby declare that the following is a full and exact description thereof, reference being had to the accompanying drawings, and to the letters of reference marked thereon.

It is necessary to explain that the present mode of purifying nitric acid from the red fumes of nitrous acid is performed by heating the distilled product of the first distillation in glass balloons, and boiling the same until it becomes colorless, and the chlorine and nitrous-acid gases are removed. This mode, as very concentrated nitric acid, specific gravity 1.500, passes into vapor at 184° Fahrenheit, or thereabouts, involves a loss of concentrated nitric acid, and the result is a nitric acid of specific gravity 1.420, whose boiling-point is 320° Fahrenheit, and a loss of the most concentrated acid.

My process consists in passing a stream of warm atmosperic air through the nitric acid in the receiver, which, in a few minutes, becomes colorless in consequence. A portion of the nitrous-acid gas is thereby converted into nitric acid, and a portion passes off into the atmosphere with the current of air.

If the condensed nitric acid to be operated upon is warm, as immediately after the distillation from sulphuric acid and nitrate soda or nitrate potash it necessarily is, then cold atmospheric air passed through the same is equally efficient. If, however, sufficient time has elapsed to cool the distillate, then a current of warm air is more effectual.

A A represent part of a battery of condensers, of the usual form used in chemical factories.

B B are the connecting-pieces.

C is an iron pipe leading from either an air-pump or compresser, whence a supply of air sufficiently compressed to overcome the height of the column of air in the receiver.

D is a stop-cock, to command the supply of air.

E is a flexible rubber tube, connecting with F, a glass tube passing to the bottom of the acid to be purified.

The operation is as follows:

Having secured a supply of compressed air, the stop-cock D is opened, the air passes through the flexible tube E, presses the column of air out of the glass tube F, and issues through the acid or mixture of acids in the receiver, and passes out of the receiver. As soon as the red fumes cease to appear, the stop-cock is closed, and the glass tube is inserted into the next receiver, and so on to the last, until the acid is colorless.

By this method the acid is rendered colorless without incurring the loss of a considerable quantity or percentage of the most concentrated nitric acid, as is the case when the distillate is transferred to a glass balloon and heated in a sand-bath, according to the mode usually practised in chemical factories.

Having thus described the nature of my invention, its principles, and mode of operation,

What I claim as my invention, and desire to secure by Letters Patent, is—

The process of separating nitrous-acid gas from nitric acid or other acids that may be mixed therewith, substantially as described.

GEO. M. MOWBRAY.

Witnesses:
J. J. HOLDEN,
HARRY MOWBRAY.